United States Patent

Bjarnø et al.

[11] Patent Number: 5,885,539
[45] Date of Patent: Mar. 23, 1999

[54] METHOD FOR SEPARATING SUBSTANCES FROM A GASEOUS MEDIUM BY DRY ADSORPTION

[75] Inventors: Odd E. Bjarnø; Geir Wedde, both of Oslo, Norway

[73] Assignee: ABB Fläkt AB, Stockholm, Sweden

[21] Appl. No.: 836,718

[22] PCT Filed: Nov. 22, 1995

[86] PCT No.: PCT/SE95/01392

§ 371 Date: Jun. 9, 1997

§ 102(e) Date: Jun. 9, 1997

[87] PCT Pub. No.: WO96/15846

PCT Pub. Date: May 30, 1996

[30] Foreign Application Priority Data

Nov. 23, 1994 [SE] Sweden ................................. 9404061

[51] Int. Cl.$^6$ .................................................. B01D 53/68
[52] U.S. Cl. .................................. 423/240 S; 423/240 R; 423/244.01
[58] Field of Search ........................... 423/240 R, 240 S, 423/244.01, 210; 422/142, 170

[56] References Cited

U.S. PATENT DOCUMENTS

| 3,760,565 | 9/1973 | Fish .............................................. 55/71 |
| 3,827,955 | 8/1974 | Bahri et al. .......................... 423/240 S |
| 3,907,971 | 9/1975 | Böhm et al. ............................. 423/240 |
| 4,501,599 | 2/1985 | Loukos ......................................... 55/71 |

FOREIGN PATENT DOCUMENTS

| 0 117 338 A1 | 9/1984 | European Pat. Off. . |
| 2-119.921 A | 5/1990 | Japan .................................. 423/244.01 |
| 1 416 344 | 12/1975 | United Kingdom ............... 423/240 S |
| WO93/02772 | 2/1993 | WIPO ................................ 423/240 S |

OTHER PUBLICATIONS

Baverez et al. "Adsorption of Hydrogen Fluoride . . . " Journal of Metals, vol. 32 No. 1, pp. 10–14, Jan. 1980.

*Primary Examiner*—Gary P. Straub
*Assistant Examiner*—Timothy C Vanoy
*Attorney, Agent, or Firm*—Burns, Doane, Swecker & Mathis, L.L.P.

[57] ABSTRACT

The treatment, through a dry adsorption process, of a gas from a hot electrolytic process for aluminum production comprises at least two stages. Particulate aluminum oxide (the adsorbent) passes through the stages of the adsorption process countercurrently to the gas. Thus, the gas is treated with a partly spent adsorbent in a first dry adsorption stage, whereupon the particulate adsorbent is separated from the gas downstream from the first adsorption stage. Part of the separated particulate adsorbent is removed from the adsorption process for recycling adsorbed fluorine-containing substances to the electrolytic process. The remainder of the separated adsorbent is recirculated in the first adsorption stage in order to optimize the adsorption of fluorine-containing substances and the desorption of sulfur dioxide from the aluminum oxide in this stage. Simultaneously, the gas is transferred to a second dry adsorption stage. In this second stage, the gas is treated with essentially unspent, reactive particulate aluminum oxide, so that any gaseous fluoride remaining in the gas is very efficiently adsorbed, while at the same time a substantial part of the sulfur dioxide in the gas is also adsorbed. Finally, this particulate aluminum oxide is separated from the gas downstream from the second dry adsorption stage, before the gas is discharged into the surrounding atmosphere. The separated aluminum oxide is transferred to the first adsorption stage, optionally after passing a desorption stage for the removal of the adsorbed sulfur dioxide in order to reduce the discharges of sulfur dioxide from the aluminum production. The separation of sulphur dioxide in the second adsorption stage is improved by recycling, to the second adsorption stage, aluminum oxide having undergone the desorption treatment.

9 Claims, 1 Drawing Sheet

METHOD FOR SEPARATING SUBSTANCES FROM A GASEOUS MEDIUM BY DRY ADSORPTION

This application is a national stage application filed under 35 U.S.C. §371 of PCT/SE95/01392 filed Nov. 22, 1995.

FIELD OF THE INVENTION

This invention relates to a method for separating, by adsorption and for recovery purposes, impurities, such as fluorine-containing gases and fluorine-containing dust, from a gas that is emitted from a process for aluminium production. The gas emitted from the process is brought into contact with an adsorbent in the form of particulate aluminium oxide, which can be recycled as raw material to the process. To be more specific, the invention concerns a multi-stage countercurrent process combining effective cleaning of the gas with a high degree of concentration of fluorine-containing substances on the adsorbent. In an environmentally advantageous embodiment of the invention, sulphur dioxide is simultaneously removed from the gas.

DESCRIPTION OF THE PRIOR ART

In a process for electrolytic production of aluminium, such as the Hall-Heroult process where aluminium is produced by reducing aluminium oxide in a melted electrolyte in the form of a fluoride-containing mineral to which aluminium oxide is supplied, the process gases are loaded with fluorine-containing substances, such as hydrogen fluoride and fluorine-containing dust. Being extremely damaging to the environment, these substances have to be separated before the process gases can be discharged into the surrounding atmosphere, while at the same time the fluorine-containing melt is essential to the electrolytic process.

The recovery of fluorine-containing compounds from gases generated in aluminium production suffers from the inconvenience that the process gas usually is loaded also with other substances, such as sulphur dioxide, which originate chiefly from the oxidation of electrodes but to some extent also from impurities found in the raw material. If recycled to the process along with the adsorbent, these substances will be emitted to the process gases and thus be concentrated in a cycle arising in the electrolytic process and the gas treatment. If concentrated in the process, these substances often have an adverse effect on the yield of the process or interfere with the process in some other way, thereby adversely affecting the process economy. Consequently, these substances should be removed from the adsorbent before this is recycled to the process. For environmental reasons, the amount of sulphur dioxide discharged from the process should be reduced.

It is previously known to use dry adsorption processes for cleaning gases generated in aluminium production, in which case aluminium oxide may be used as adsorbent. Aluminium oxide ($Al_2O_3$), which as raw material is supplied to the process for aluminium production, has a great capacity to adsorb (more specifically, to chemically adsorb) hydrogen fluoride. Aluminium-oxide powder of commercial qualities and of a particle size in the range of 0.03–0.16 mm has a porous structure and an active surface of 40–80 $m^2/g$, such that large amounts of hydrogen fluoride can be adsorbed before the aluminium oxide is saturated. It is, however, true that the adsorption capacity diminishes when the active surface is all but covered by adsorbed hydrogen-fluoride molecules, i.e. when the aluminium oxide is saturated with hydrogen fluoride. Usually, particulate aluminium oxide is efficiently and turbulently mixed with the gases from the aluminium-production process in a fluidised bed or some other contact reactor, hydrogen fluoride being then adsorbed on the aluminium oxide. The aluminium oxide, which now contains adsorbed fluorides, is separated downstream from the contact reactor with the aid of one or more filters. The aluminium oxide is then supplied to the aluminium-production process, and the fluorides are recovered. However, also sulphur dioxide is to a certain extent (as a rule 10–30%) adsorbed in these processes, and the sulphur dioxide thus accompanies the aluminium oxide back to the aluminium-production process, where it is released to the process gases in the furnace. In actual practice, the sulphur dioxide thus is not removed from the gases, but is instead in undesirable fashion recycled and concentrated in a system including the aluminium-production furnace and the gas-cleaning equipment, and one further obtains an increase of the sulphur-dioxide content in the air on the premises. If one wishes to reduce the environmentally-hazardous discharge of sulphur dioxide from the aluminium production, the sulphur dioxide has to be separated from the flue gases with the aid of wet separators arranged downstream from prior-art dry adsorption processes. However, such wet separators used for separating sulphur dioxide from the gases represent a very expensive solution, since the amounts of gas involved are considerable and the sulphur-dioxide concentration therein is low, for instance as compared with that of flue gases from a fossile-fired power plant. For this reason, most of the world's aluminium plants still discharge all the sulphur dioxide into the surrounding atmosphere.

One object of this invention is to provide a method for, with the aid of dry adsorption on aluminium oxide, separating essentially all the fluorine-containing substances for recovery purposes, as well as efficiently separating sulphur dioxide for environmental reasons, from a gas emitted from a process for aluminium production.

Another object of the invention is to provide a process by means of which sulphur dioxide and, to a certain extent, also other undesirable impurities on the adsorbent can be removed therefrom before the adsorbent is recycled to the process for aluminium production, thereby to avoid recirculation and accumulation of these substances in the system.

Yet another object of the invention is to provide a process which, in comparison with prior-art dry gas-cleaning processes, results in maintained or improved separation and recovery of fluorine-containing substances, while maintaining or improving the environmental-friendly character of the process (low emissions), as compared with the prior-art processes mentioned above.

DESCRIPTION OF THE INVENTION

According to the invention, these objects are achieved by an adsorption process which comprises at least two dry adsorption stages, in which a gas, which is generated in a process for aluminium production and is loaded at least with fluorine-containing substances that may be gaseous or particulate, is mixed with and brought into contact with particulate aluminium oxide, thereby to separate at least the fluorine-containing substances from the gas. The adsorption stages are arranged in the form of one or more contact reactors, in which the gas is treated by being mixed and contacted with particulate aluminium oxide.

In the adsorption process according to the invention, the gas is treated in a first dry adsorption stage with at least partly spent particulate aluminium oxide, such that a substantial part of the gaseous fluorides found in the gas are adsorbed on the adsorbent, the aluminium oxide with adsorbed fluorine-containing substances is separated from the gas downstream from the first adsorption stage, whereupon part of the separated aluminium oxide with adsorbed fluorine-containing compounds is removed from the adsorption process, and the remainder of the aluminium oxide is recirculated in the first adsorption stage, while at the same time the gas is transferred to a second dry adsorption stage arranged downstream from the first adsorption stage, the gas now having a substantially reduced content of fluorine-containing substances is then, in the second dry adsorption stage, treated with essentially unspent reactive aluminium oxide in particulate form, thereby to adsorb any fluorine-containing substances remaining in the gas after the first adsorption stage and to adsorb other gases, such as sulphur dioxide, and the particulate aluminium oxide is then removed from the gas downstream from the second adsorption stage, before the gas is discharged into the surrounding atmosphere or undergoes a supplementary treatment downstream, and at least part of the aluminium oxide separated from the gas downstream from a contact reactor included in the second adsorption stage is transferred to a contact reactor included in the first adsorption stage.

As appears from the foregoing, the particulate aluminium oxide passes through the stages of the adsorption process countercurrently to the gas. The unspent aluminium oxide is first supplied to a contact reactor which is included in the second dry adsorption stage and where the aluminium oxide is mixed with and brought into contact with the gas. From the contact reactor included in the second adsorption stage, at least some of the now partly spent aluminium oxide is transferred to a contact reactor included in the first adsorption stage. When supplied to a contact reactor included in the first dry adsorption stage, aluminium oxide from the second adsorption stage is mixed with and brought into contact with the gas in this first adsorption stage. After passing through a contact reactor included in the first adsorption stage, part of the dry particulate aluminium oxide is separated, the aluminium oxide being now essentially saturated at least with fluorine-containing substances and being removed from the process, thereby to recycle fluorine-containing substances to the process for aluminium production, the remainder of the aluminium oxide being recirculated in the first adsorption stage.

This recirculation is motivated by two reasons. First, one wishes to control and optimise the adsorption of gaseous fluoride from the process gas in the first adsorption stage. Second, one wishes to obtain the aimed-at desorption of such substances as sulphur dioxide, which have been adsorbed on the aluminium oxide in the second adsorption stage, thereby to prevent any substantial recycling of these substances to the electrolytic process. Should sulphur (sulphur dioxide) or phosphorus (phosphorus pentoxide) be recycled to the electrolytic process, this might have an adverse effect on the yield of this process.

Since aluminium oxide has a much higher affinity with hydrogen fluoride than with such gases as sulphur dioxide, it is possible, by partly recirculating the adsorbent in at least the first adsorption stage, to check which substances are recycled to the electrolytic process along with the adsorbent transferred to the electrolysis furnace, thus preventing undesirable substances, such as sulphur dioxide and phosphorus pentoxide, from being recirculated and concentrated in the system including the electrolysis furnace and the gas-treatment equipment. All such gases are adsorbed and molecularly bound to the active surface of the oxide particle in a dry adsorption process. Since, however, hydrogen fluoride has a higher affinity with the oxide than with sulphur dioxide, the sulphur dioxide already adsorbed will be desorbed, while hydrogen fluoride takes the place of the sulphur dioxide on the active surface. Under excellent contact conditions between process gas and adsorbent, the adsorption process strives towards a state of equilibrium with a very high proportion of adsorbed hydrogen fluoride on the oxide surface, where adsorbed sulphur dioxide only occurs if there is an excess of active adsorbent surface in relation to the amount of hydrogen fluoride present in the process. Owing to the fact that the adsorbent is recirculated in the first adsorption stage, the process approaches this state of equilibrium. As a result, the adsorption of undesirable substances can be monitored and minimised, such that it is only a minimum of these substances that is recycled to the electrolysis furnace together with the adsorbent.

In one embodiment of the invention intended for use when one wishes to avoid that undesirable substances, such as sulphur dioxide, that have been adsorbed on the adsorbent are recycled to the electrolysis furnace, but one nevertheless may allow these substances to be discharged into the surrounding atmosphere, the adsorbent (aluminium oxide) is transferred from the second adsorption stage directly to the first adsorption stage, where it is recirculated while sulphur dioxide is desorbed. The desorption is guided towards a state of equilibrium. Sulphur dioxide is emitted from the electrolysis process and accompanies the process gas to the first adsorption stage. However, the adsorption of sulphur dioxide in this first stage is controlled and minimised through adsorbent recirculation in this stage. As a result, the sulphur dioxide will be concentrated in a cycle between the first and the second adsorption stage, whereas essentially no sulphur dioxide will be recirculated between the electrolysis furnace and the first adsorption stage. At steady state, a state of equilibrium finally establishes itself, in which the amount of sulphur dioxide discharged into the surrounding atmosphere equals the amount of sulphur dioxide emitted to the process gases in the electrolysis furnace.

DRAWING

For exemplifying purposes, the invention will now be described in more detail with the aid of a preferred embodiment, reference be had to the accompanying drawing.

DESCRIPTION OF THE DRAWING

In the Hall-Héroult process, aluminium is produced by reducing aluminium oxide, which is dissolved in a melt of fluorine-containing minerals, with the aid of electrolysis in an electric reduction furnace 1. The electrolysis takes place at a temperature of approximately 960° C. The melt is partly disintegrated during the process, and volatile components leave in gaseous state. As a result, the gases emitted from the process contain fluorine compounds, such as hydrogen fluoride (HF) and fluorine-containing dust. Being extremely damaging to the environment, these substances have to be separated from the process gases before these can be discharged into the surrounding atmosphere. At the same time, however, these fluorine-containing substances represent a loss of considerable value. Apart from the fluorine-containing compounds, there are present certain combustion products, such as sulphur dioxide, from the carbon anodes, which are combusted during the process. Sulphur dioxide should be removed from the adsorbent not only in order to avoid that it is recycled to the process, but also because it is desirable, for environmental reasons, to reduce the discharges of sulphur dioxide from the process without having to set up vast and costly plants for treating the large amounts of gas having a low content of sulphur dioxide.

When the invention is used for treating a gas 2 emitted from a process 1 for aluminium production, fluorine-containing substances are separated from the gas in a countercurrent adsorption process comprising at least two dry adsorption stages 3, 4. The gas loaded with fluorine-containing substances is treated in a first dry adsorption stage 3, which in the Figure is shown as a contact reactor 3. In this contact reactor 3, the gas is mixed with and brought into contact with a partly spent particulate adsorbent in the form of aluminium oxide, which is conveyed with the current of gas in the contact reactor 3, the content of fluorine-containing substances in the process gas being reduced. The adsorption of sulphur dioxide during the treatment in the first adsorption stage 3, when the content of fluorine-containing substances in the gas is at its highest, is suppressed since such substances as hydrogen fluoride have a much greater affinity with aluminium oxide than with sulphur dioxide. In this first adsorption stage, sulphur dioxide is thus only adsorbed on excess surface on the aluminium oxide, which is not covered by e.g. hydrogen fluoride. If aluminium oxide on which sulphur dioxide has been adsorbed comes into sufficiently intensive contact with gas containing hydrogen fluoride, the sulphur dioxide will be released and replaced by hydrogen fluoride. After the treatment in the first adsorption stage 3, the particulate aluminium oxide is separated from the gas before the latter, now having a very low content of hydrogen fluoride, is transferred to a second dry adsorption stage 4 for treatment there. The particulate aluminium oxide, which has a high content of adsorbed fluorine-containing substances, such as hydrogen fluoride, is separated from the gas along with the main part of the particulate fluorine compounds downstream from the first adsorption stage 3 with the aid of prior-art mechanical separating devices 31, such as cyclones. Some aluminium oxide 33, which corresponds to the amount of unspent aluminium oxide supplied to the second adsorption stage 4 of the adsorption process and which is loaded with adsorbed fluorine-containing substances, is (at 33) recycled to the process 1, while the remainder of the aluminium oxide is recirculated (at 32) within the first adsorption stage 3. Through sufficient recirculation and owing to the difference in the affinity of the aluminium oxide with respectively hydrogen fluoride and sulphur dioxide, it is ensured that the main part of the fluorine-containing substances in the gas are adsorbed even at the first adsorption stage 3, whereas there is essentially no adsorption of sulphur dioxide. Instead, a substantial amount of the sulphur dioxide 1 adsorbed on the aluminium oxide is desorbed. As a result, essentially all the sulphur dioxide will accompany the gas, so that the fluorine-containing substances vital to the process 1 can be recycled with a good yield at 33, while avoiding the recirculation and concentration of sulphur dioxide in the process. Also the second adsorption stage 4 is arranged in the form of one or more contact reactors 4 disposed downstream from the first adsorption stage 3. From the first adsorption stage 3 and the following separator 31, the gas is transferred at 30 to the contact reactors 4, where it is mixed with and brought into contact with fresh, reactive and essentially unspent aluminium oxide. In the contact reactor 4, any remaining gaseous fluorine, as well as sulphur dioxide, is adsorbed in an amount depending on the extent to which the adsorption capacity of the fresh adsorbent (aluminium oxide) allows adsorption of low-affinity gas. After the treatment in the second adsorption stage 4, the adsorbent is separated from the gas with the aid of a filter 41, such as a bag filter, whereupon the gas, which has been very efficiently cleaned of all fluorine-containing substances, can be discharged into the surrounding atmosphere at 5, whereas the aluminium oxide loaded with a substantial amount of the sulphur dioxide adsorbed in the second adsorption stage 4 is, in accordance with the invention, transferred to the first adsorption stage 3. Through suitable recirculation of aluminium oxide 32 in the adsorption stage 3, a substantial amount of the sulphur dioxide adsorbed on the aluminium oxide will, when contacted with process gas having a higher content of hydrogen fluoride, be desorbed in the adsorption stage 3. The released sulphur dioxide is then conducted along with the process gas to the second adsorption stage 4. Owing to the desorption of sulphur dioxide, there is an increase in the active surface on the aluminium oxide that is available to hydrogen fluoride adsorption, resulting in a highly efficient adsorption of hydrogen fluoride, such that a very high degree of adsorption of gaseous fluorine is obtained in the first adsorption stage 3.

Figure 1:
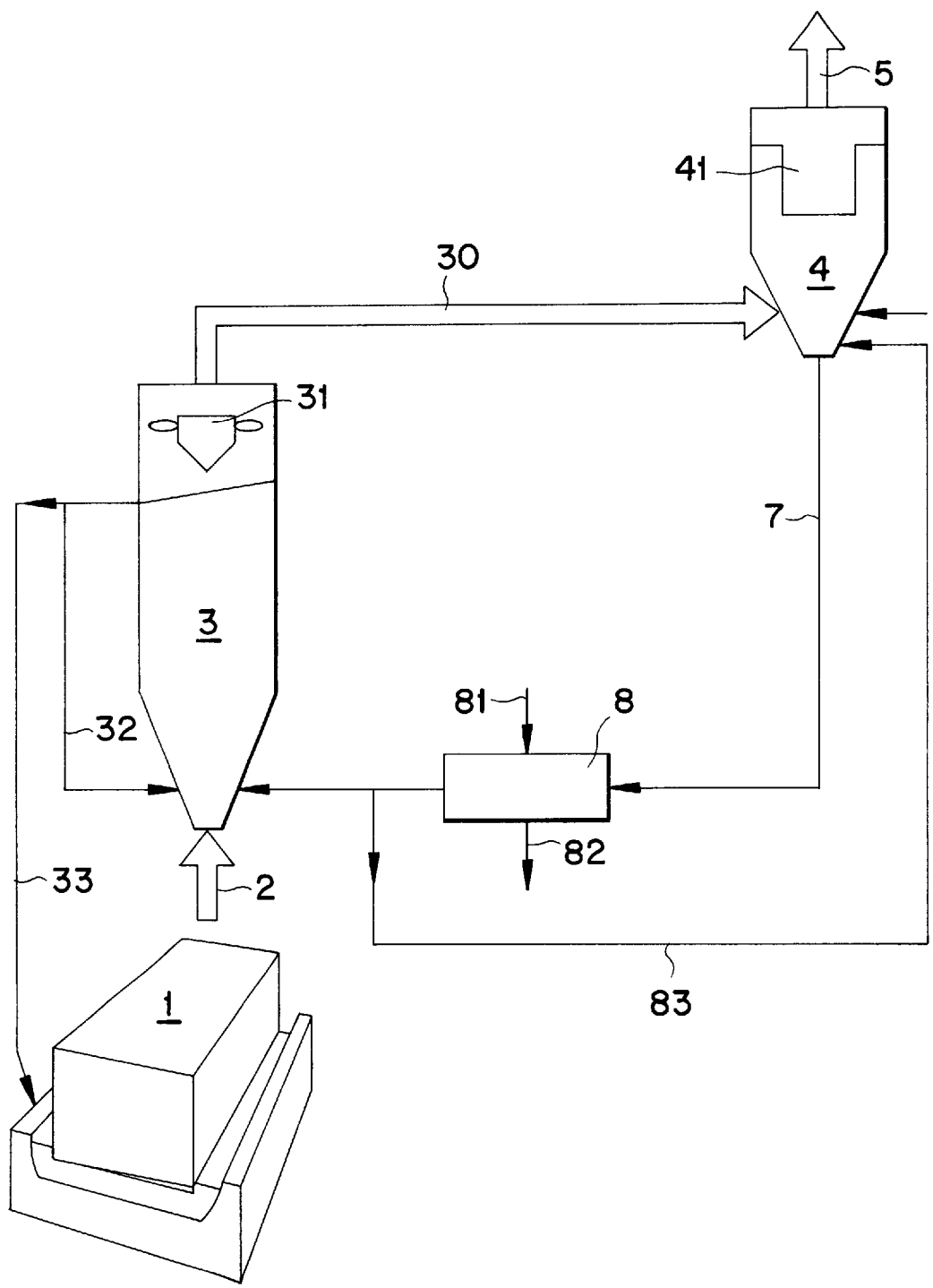

Through the aluminium oxide 33 that is transferred to the reduction process 1 from the first adsorption stage 3, substantially all fluorine-containing substances emitted from the reduction process 1 to the process gas 2 are recycled to the reduction process 1. However, essentially no sulphur dioxide is recycled to the reduction process 1 along with the aluminium oxide 33 transferred from the first adsorption stage 3 to the reduction process 1.

Owing to the fact that sulphur dioxide is desorbed in the first adsorption stage, the partly cleaned process gas 30 transferred to the second adsorption stage 4 will have an increased sulphur-dioxide content, which to some extent is reduced in the second adsorption stage 4. At steady state, a state of equilibrium is established as regards the recirculation of concentrated sulphur dioxide between the two adsorption stages 3 and 4, the amount of sulphur dioxide discharged along with the cleaned process gas 5 equalling the amount of sulphur dioxide supplied together with the as yet uncleaned process gas.

In one embodiment of the invention, also the sulphur dioxide discharged to the surrounding atmosphere together with the cleaned process gas 5 is reduced by treating the sulphur-dioxide-loaded aluminium oxide from the second adsorption stage 7 in a desorption stage 8. In this desorption stage 8, substantially all the adsorbed sulphur dioxide is desorbed by being heated and mixed with a through-flowing carrier gas 81. The carrier gas 82 leaving the desorption stage 8 will then have a high concentration of sulphur dioxide, essentially all the sulphur dioxide having been emitted from the aluminium oxide through desorption.

Owing to the low affinity of sulphur dioxide with aluminium oxide, the aluminium oxide has a fairly restricted capacity to adsorb sulphur dioxide. One thus obtains, even at such a low content of gaseous fluoride in the process gas 30 transferred to the second adsorption stage 4 as has an essentially negligible effect on the sulphur-dioxide adsorption during this adsorption stage 4, a poor separation of sulphur dioxide from the process gas, if the adsorbent quality is low and/or if the sulphur-dioxide content of the process gas supplied to this second adsorption stage 4 is high. In one embodiment of the invention, the capacity to separate sulphur dioxide is raised to the aimed-at level by recycling (at 83) part of the aluminium oxide treated in the desorption stage 8 to the second adsorption stage 4, where it contributes to an increase in the amount of active adsorbent. The amount of aluminium oxide treated in the desorption stage 8 will thus increase proportionally to the amount of aluminium oxide recycled at 83 from the desorption stage 8 to the second adsorption stage 4.

In the desorption stage 8, the sulphur dioxide is desorbed owing to the effect of heating and through-flowing carrier gas 81, entraining the sulphur dioxide with it on its way out of the system. If the desorption treatment in stage 8 is correctly performed, only a small amount of carrier gas 81 is required, while at the same time a high concentration of sulphur dioxide is obtained in the carrier gas 82 leaving the desorption stage. The sulphur dioxide in the carrier gas can, at a reasonable cost, be washed or converted to commercial products, such as liquid sulphur dioxide, sulphuric acid or sulphur, by using well-known processes, since there is only a small amount of carrier gas 82 involved, for which reason the treatment equipment may be of small size. The slight heating of the aluminium oxide required in order to desorb the sulphur dioxide in the desorption stage 8 does not result in a desorption of the small amount of hydrogen fluoride that has been adsorbed in the second adsorption stage 4. After the desorption stage 8, the aluminium oxide is conducted to the first adsorption stage 3, as has been described in the foregoing.

After having thus passed the dry two-stage adsorption process 3, 4 countercurrently to the gas and adsorbed substantially all the hydrogen fluoride and other fluorine-containing substances from the gas, the aluminium oxide is supplied to the process 1 for aluminium production. The sulphur-dioxide content of the aluminium oxide is very low and is essentially limited to the amount that has been adsorbed and has remained during the treatment in the first adsorption stage 3. Certain other substances, such as phosphorus, which have been entrained with the gas from the aluminium-production process 1 and which reduce the current yield in the electrolytic process, have an adverse effect on the process and should therefore be removed. Phosphorus in the form of particulate phosphorus pentoxide is removed from the process gas in a final filtration stage 41 and may thus be concentrated in the system including the electrolysis furnace and the gas-treatment equipment. It has been found that the treatment for the removal of sulphur dioxide 8 also removes a certain amount of phosphorus, thereby reducing the accumulation thereof in the system.

Since, in accordance with the inventive method, the particulate adsorbent (the aluminium oxide) passes the two stages 3, 4 of the adsorption process countercurrently to the gas, whereas the gas and the adsorbent are jointly conveyed with the current in the adsorption stages 3, 4, the adsorbent is efficiently spent and essentially all the hydrogen fluoride separated in the first adsorption stage 3 and recycled along with the adsorbent to the aluminium-production process 1, while sulphur dioxide is separated in the second adsorption stage 4 and is removed from the adsorbent in the desorption stage 8. The separation of sulphur dioxide can be adjusted to the aimed-at efficiency through the recirculation at 83 of the adsorbent from the desorption stage 8 to the second adsorption stage 4. This two-stage process results in recycling with a high yield of the fluorine-containing substances that one wishes to recirculate from the process, whereas the sulphur dioxide can be separated by itself and either be neutralised in an alkali scrubber or be recovered in the form of commercially viable products. Since the process according to the invention in its simplest form reduces the recirculation and accumulation of sulphur dioxide and in its more elaborate form also reduces the recirculation and accumulation of such a pollutant as phosphorus in the aluminium-production process, there is achieved an improved efficiency in the electrolytic process for aluminium production, since this process would otherwise be adversely affected by increasing contents of these substances. Since sulphur can be separated in one embodiment of the invention, the environmental friendliness of aluminium production in its entirety can be improved.

We claim:

1. A method for separating fluorine-containing substances from a gas emitted from a process for aluminum production by means of adsorption on solid, particulate aluminum oxide in a dry adsorption process, comprising:

treating said gas in a first dry adsorption process with partly spent particulate aluminum oxide to absorb fluorine-containing substances, said aluminum oxide passing countercurrently to said gas;

separating the particulate aluminum oxide with adsorbed fluorine-containing substances from said gas downstream from said first adsorption stage, before said gas is transferred to a second dry adsorption stage;

removing part of the separated particulate aluminum oxide with adsorbed fluorine-containing substances from the adsorption process and recycling said part of separated particulate aluminum oxide with fluorine-containing substances to the process for aluminum production, the remainder of the separated aluminum oxide being recirculated in the first adsorption stage; and after separation of said aluminum oxide, supplying said gas to a second dry adsorption stage and treating said gas with essentially unspent reactive particulate aluminum oxide, said unspent aluminum oxide passing countercurrently to said gas, whereupon the particulate aluminum oxide is separated from the gas downstream from the second dry adsorption stage, before said gas is discharged into the surrounding atmosphere, and at least part of the aluminum oxide separated downstream from the second adsorption stage is transferred to the first adsorption stage.

2. A method as claimed in claim 1, wherein the amount of partly spent aluminum oxide recirculated is monitored and so controlled as to optimize the adsorption of fluorine-containing substances onto the aluminum oxide and the desorption of sulfur dioxide from the aluminum oxide in the first adsorption stage.

3. A method as claimed in claim 2, wherein said gas contains at least hydrogen fluoride and sulfur dioxide, and wherein the aluminum oxide separated downstream from the second adsorption stage contains sulfur dioxide adsorbed from said gas, and treating said aluminum oxide with adsorbed sulfur dioxide in a desorption stage where the aluminum oxide is heated and a carrier gas flows through it, thereby desorbing a substantial amount of the sulphur dioxide adsorbed on the aluminum oxide.

4. A method as claimed in claim 3, wherein part of the aluminum oxide treated in the desorption stage is recycled to the second adsorption stage in order to enhance the adsorption capacity in this stage.

5. A method as claimed in claim 4, wherein water vapor or nitrogen gas flows through the aluminum oxide in the desorption stage.

6. A method as claimed in claim 1, wherein said gas contains at least hydrogen fluoride and sulfur dioxide, and wherein the aluminum oxide separated downstream from the second adsorption stage contains sulfur dioxide adsorbed from said gas, and treating said aluminum oxide with adsorbed sulfur dioxide in a desorption stage where the aluminum oxide is heated and a carrier gas flows through it, thereby desorbing a substantial amount of the sulphur dioxide adsorbed on the aluminum oxide.

7. A method as claimed in claim 6, wherein part of the aluminum oxide treated in the desorption stage is recycled to the second adsorption stage in order to enhance the adsorption capacity in this stage.

8. A method as claimed in claim 7, wherein water vapor or nitrogen gas flows through the aluminum oxide in the desorption stage.

9. A method as claimed in claim 6, wherein water vapor or nitrogen gas flows through the aluminum oxide in the desorption stage.

* * * * *